United States Patent
Jines (10) Patent No.: US 6,328,508 B1
(45) Date of Patent: Dec. 11, 2001

(54) INDEXING DEVICE FOR A MACHINE TOOL

(76) Inventor: Arnold R. Jines, 614 Keeler Dr., Avon, IN (US) 46123

( * ) Notice: Subject to any disclaimer, the term of this patent is extended or adjusted under 35 U.S.C. 154(b) by 0 days.

(21) Appl. No.: 09/630,622

(22) Filed: Aug. 2, 2000

(51) Int. Cl.$^7$ .............................. B23C 9/00; B23Q 16/06
(52) U.S. Cl. .................. 409/221; 409/223; 409/131; 74/813 L; 74/822
(58) Field of Search ...................... 409/221, 222, 409/223, 224, 134, 131; 74/813 L, 813 R, 813 C, 816, 817, 822

(56) References Cited

U.S. PATENT DOCUMENTS

| | | | |
|---|---|---|---|
| 1,200,638 | * 10/1916 | Moor | 409/222 |
| 1,309,593 | * 7/1919 | Bolgiano | 409/222 |
| 2,376,137 | 5/1945 | Hallowell, Jr. . | |
| 2,421,327 | * 5/1947 | Hallowell, Jr. | 74/822 |
| 2,570,444 | 10/1951 | Henkel . | |
| 2,890,606 | * 6/1959 | Wahlgren | 409/223 |
| 2,921,478 | * 1/1960 | Merchant | 74/817 |
| 3,580,111 | * 5/1971 | Tyrner | 74/817 |
| 3,581,602 | * 6/1971 | Bachmann | 74/822 |
| 3,587,390 | 6/1971 | Lohneis et al. . | |
| 3,633,442 | 1/1972 | Stoen . | |
| 3,762,228 | * 10/1973 | Crepin | 74/822 |
| 3,965,775 | 6/1976 | Pinkesfeld . | |
| 4,529,342 | 7/1985 | Babel . | |
| 4,617,720 | 10/1986 | Palfery et al. . | |
| 4,664,570 | 5/1987 | Tsukiji et al. . | |
| 4,771,646 | * 9/1988 | Ruggier et al. | 409/221 |
| 4,827,801 | 5/1989 | Gusching . | |
| 4,884,474 | 12/1989 | Kawata . | |
| 4,999,894 | 3/1991 | Berry et al. . | |
| 5,044,055 | 9/1991 | Howarth et al. . | |
| 5,136,896 | 8/1992 | Burka . | |
| 5,297,454 | 3/1994 | Ito . | |
| 5,481,944 | 1/1996 | Oketani et al. . | |
| 5,643,065 | 7/1997 | Whitesel . | |
| 5,802,698 | 9/1998 | Fitzgerald et al. . | |
| 5,810,529 | * 9/1998 | Morz | 409/222 |

OTHER PUBLICATIONS

YUASA—Super Rapidex Visedex Product Specification Data Sheet.

* cited by examiner

Primary Examiner—William Briggs
Assistant Examiner—Erica E Cadugan
(74) Attorney, Agent, or Firm—Woodard, Emhardt, Naughton, Moriarty & McNett (57) ABSTRACT

An indexing device and method is provided to selectively orient work pieces at predetermined angular positions and hold the work pieces at those positions. The indexing device has a rotary member rotatably coupled to a support and a trigger pivotally coupled to the support. The rotary member holds a fixture and has a plurality of index pins extending from the rotary member at equally spaced about the axis of rotation. The trigger operates a stop assembly to engage holes in the rotary member to position the working holding fixture at the desired position. The indexing device is constructed such that the trigger and one of the index pins can be simultaneously contacted by a control member. The trigger includes an elongated contact surface along which the control member translates to contact the index pins and rotate the rotary member.

30 Claims, 7 Drawing Sheets

INDEXING DEVICE FOR A MACHINE TOOL

FIELD OF THE INVENTION

The invention relates generally to the field of machine tools, and more particularly, to an improved work piece holding device mountable on a work surface and useful for selectively positioning the work piece.

BACKGROUND OF THE INVENTION

The art has provided various indexing devices mountable on a work surface of machine tools that are useful for holding work pieces at selected angular positions for machine tool applications. However, prior art indexers have had several disadvantages including, for example, excessive weight, complicated machine tool interface, imprecise angular locking, the inability to sequentially index in separate directions, or the inability to be easily customized or adapted for different applications. Accordingly, there is a need for an indexer that addresses some or all of these problems and does so in an efficient, reliable, and precise manner.

SUMMARY OF THE INVENTION

The present invention is directed to an indexing device for use with a machine tool. The indexing device includes a rotary member that is contactable by a control member of the machine tool. The device also includes a trigger that, when actuated by the control member, allows the rotary member to rotate when the control member applies a rotary force to the rotary member.

According to one aspect of the invention, there is provided an indexing device with a work holding fixture coupled to a rotary member rotatably mounted on a support member. Three or more pins extend from a surface of the rotary member and are positioned about its axis of rotation such that the angle between any two adjacent pins relative to the axis of rotation is less than 180 degrees. The indexing device further includes a stop assembly coupled to a trigger assembly. The stop assembly is moveable between a first position in contact with the rotary member and a second position allowing rotational movement of the rotary member. The control member is positionable to contact the trigger assembly to move the stop assembly from its first position to its second position while contacting one of the pins to rotate the rotary member.

According to another aspect of the invention, there is provided a device for machining a work piece. The device includes a control member operatively connected to a machine tool. The device further includes a rotary member rotatably mounted to at least one support member. The rotary member includes a plurality of pins. A stop assembly includes a plunger that is biased generally towards the rotary member. A trigger is coupled to the support member and is also coupled to an actuator in contact with the stop assembly such that the trigger is operable to move the plunger between engagement and disengagement with the rotary member. The control member is positionable to actuate the trigger while in contact with one of the plurality of pins to rotate the rotary member.

According to a further aspect of the invention, there is provided an indexing device for use with a machine tool that includes a control member. The indexing device includes a support member and a work holding fixture mounted to a rotary member. The rotary member is rotatably coupled to the support member about an axis of rotation. The rotary member has a plurality of index pins extending therefrom. A trigger assembly is mounted to the support member. The trigger assembly includes a trigger having a contact surface with a length that is at least as great as the length between adjacent ones of the plurality of index pins. The control member is positionable to simultaneously contact the trigger and one of the plurality of index pins to rotate the rotary member by translating along the trigger contact surface.

There is further provided methods for machining a work piece. Such methods include: providing an indexing device including a rotary member rotatable about an axis and having a plurality of index pins extending therefrom, the indexing device further including a trigger coupled to a stop assembly; engaging a work holding fixture coupled to the rotary member; mounting a work piece to the work holding fixture; contacting the trigger to move the stop assembly from a first position preventing rotation of the rotary member to a second position allowing rotation of the rotary member; and contacting one of the plurality of index pins while maintaining contact with the trigger to rotate the rotary member.

These and other aspects, advantages, features, embodiments, and objects of the present invention will be apparent to those skilled in the art based on the following descriptions of the illustrated embodiments of the present invention.

DESCRIPTION OF THE ILLUSTRATED EMBODIMENTS

For purposes of promoting an understanding of the principles of the invention, reference will now be made to the embodiments illustrated in the drawings and specific language will be used to describe the same. It will nevertheless be understood that no limitation of the scope of the invention is thereby intended. Any such alterations and further modifications in the illustrated devices, and such further applications of the principles of the invention as illustrated therein are contemplated as would normally occur to one skilled in the art to which the invention relates.

In the description that follows, it should be understood that like reference numeral are intended to identify the same or similar structural elements, portions, or surfaces consistently throughout the several drawing figures and the accompanying written description. Unless otherwise indicated, the drawings are intended to be read (e.g., cross-hatching, arrangement of parts, proportion, degree, etc.) together with the specification, and are to be considered as portion of the entire written description of this invention. Moreover, as used in the following description, the terms "horizontal", "vertical", "top", "bottom", "left", "right", "up", and "down", as well as adjectival and adverbial derivatives thereof, simply refer to the orientation of the illustrated structure as the particular drawing figure faces the reader.

Figure 1:
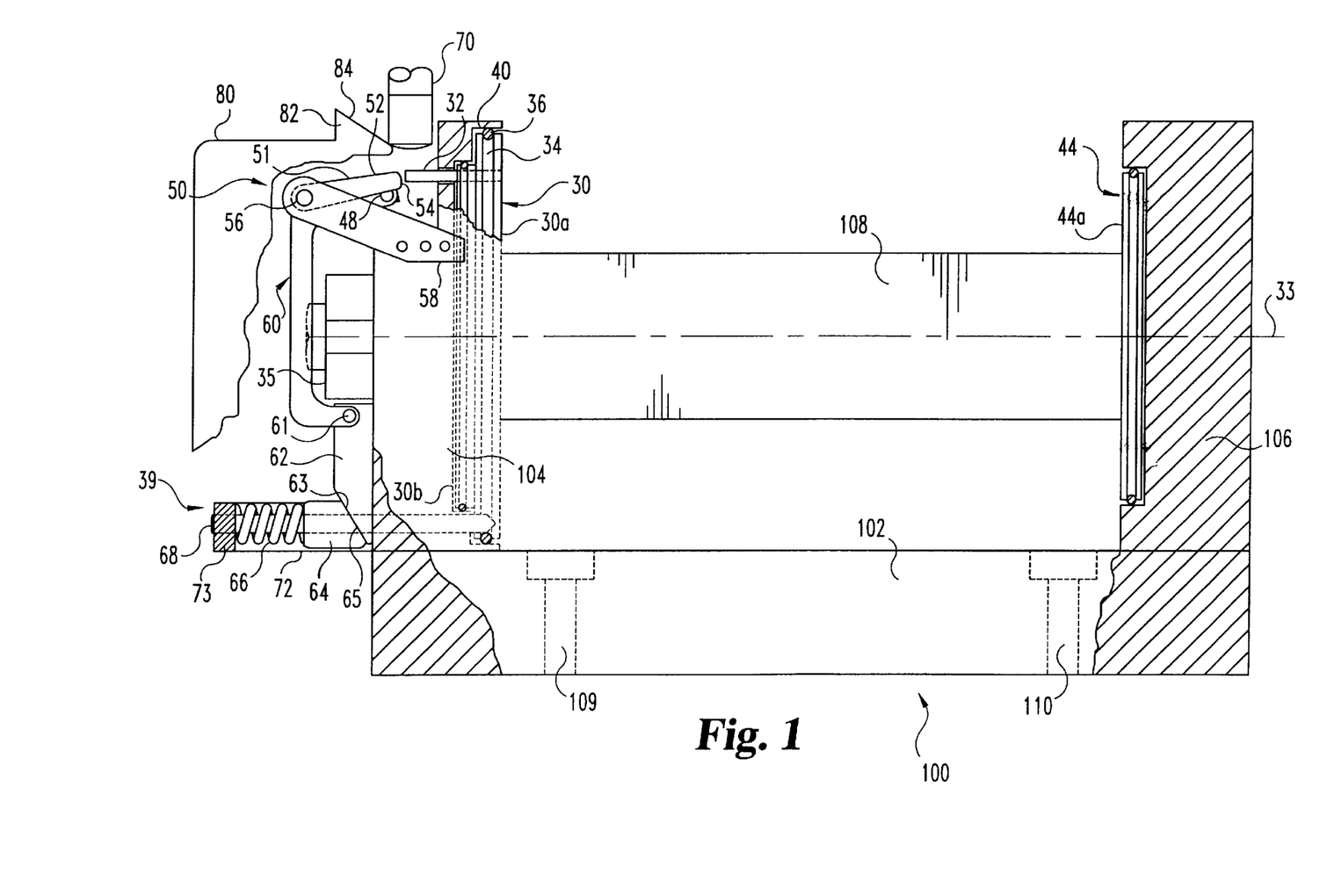
FIG. 1 is a side elevational view of an indexing device in partial section at the support members and with a cutaway of a cover member according to one embodiment of the present invention

A side view of one embodiment of an indexing device 100 according to the present invention is depicted in FIG. 1. Indexing device 100 generally includes a base 102 having two supports 104 and 106 extending therefrom. The base 102 is mountable on a machine tool work surface by placing fasteners placed through anchor holes 109 and 110. Device 100 further includes work holding fixture 108 extending between supports 104 and 106. Work holding fixture 108 is adapted to receive work pieces or parts that are to be machined. Fixture 108 can be provided with a rectangular cross-section having one or more work surfaces with a plurality of holes therein for mounting parts or part holders as is known in the art. Other cross-sectional shapes and attachments for fixture 108 are also contemplated as would occur to those skilled in the art.

It is contemplated that indexing device 100 can be mounted on a numerically controlled machine tool, such as a lathe, milling machine, drill press, and the like, with the parts to be machined mounted on fixture 108. While indexing device 100 can be provided with electric or fluid operable components, the interface between indexing device 100 and the control member of the machine tool can be accomplished in purely mechanical fashion. Device 100 can thus be used with conventional programmable machine tools, and device 100 can be quickly and easily installed on the machine tool.

Referring now further to FIGS. 2–5, indexing device 100 includes rotary members or wheels 30 and 44 are rotatably mounted on supports 104 and 106, respectively, about axis 33. Work holding fixture 108 extends between mounting face 30a of wheel 30 and mounting face 44a of wheel 44 and is coupled to wheel 30 and wheel 44. Wheel 30 includes an inner face 30b opposite mounting face 30a facing support 104. Wheel 30 is placed in a recessed portion 40 of support 104, and is sealed therein via an O-ring 36 positioned in a groove 34 of wheel 30. Device 100 further includes a bolt assembly 35 having an axle 37 centered about axis of rotation 33 for mounting work holding fixture 108 to wheel 30. Support 106 and wheel 44 can be similarly arranged.

Wheel 30 further includes a plurality of index pins 32 for rotating wheel 30 via a control member 70 of the machine tool. Device 100 includes a trigger assembly 50 coupled to a stop assembly 39. Trigger assembly 50 is operable along with stop assembly 39 to selectively release and stop wheel 30 at selected angular positions about axis 33. Index pins 32 extend from inner face 30b of index wheel 30 and through a slot 103 formed through support 104 and are accessible for contact by control member 70. Index pins 32 are secured to index wheel 30 a distance away from the axis of rotation 33 of wheel 30 so that wheel 30 rotates about axis 33 when control member 70 applies a force to one of the index pins 32. Preferably index pins 32 extend from wheel 30 parallel to the axis of rotation 33 and extend through support 104 toward a leading end surface 54 of a trigger 51 forming a portion of trigger assembly 50. Most preferably pins 32 extend to be within a sufficient distance of end surface 54 such that control member 70 can simultaneously contact both trigger 51 and pin 54. Thus, in the illustrated embodiment, the horizontal distance from surface 54 to the end of pin 32 is less than the lateral dimension of control member 70.

Opposite leading end surface 54 trigger 51 is hingedly connected at either end to support arms 58 by pin 56, and arms 58 are mounted on support 104. Trigger 51 has contact surface 52 extending along trigger 51 adjacent control member 70. The side of trigger 51 opposite contact surface 52 is pivotally coupled to an upper end 67 of actuator 60 via pin 48. Actuator 60 extends from trigger 51 across axis 33, where a bottom portion of actuator 60 is coupled to a cam 62 with fastener 61.

Device 100 further includes a stop assembly 39 having a portion that is operable to engage or contact wheel 30 to prevent its rotation about axis 33 and to release wheel 30 for rotation about axis 33. Stop assembly 39 includes a cam follower 64 coupled to a plunger 68 movably received in a housing 72. Housing 72 includes a stop or end wall 73. Spring 66 surrounds plunger 68 between end wall 73 and cam follower 64, and spring 66 biases cam follower 64 towards index wheel 30. Cam 62 has a cam surface 63 in slideable contact with an angled surface 65 of cam follower 64.

Figure 2:
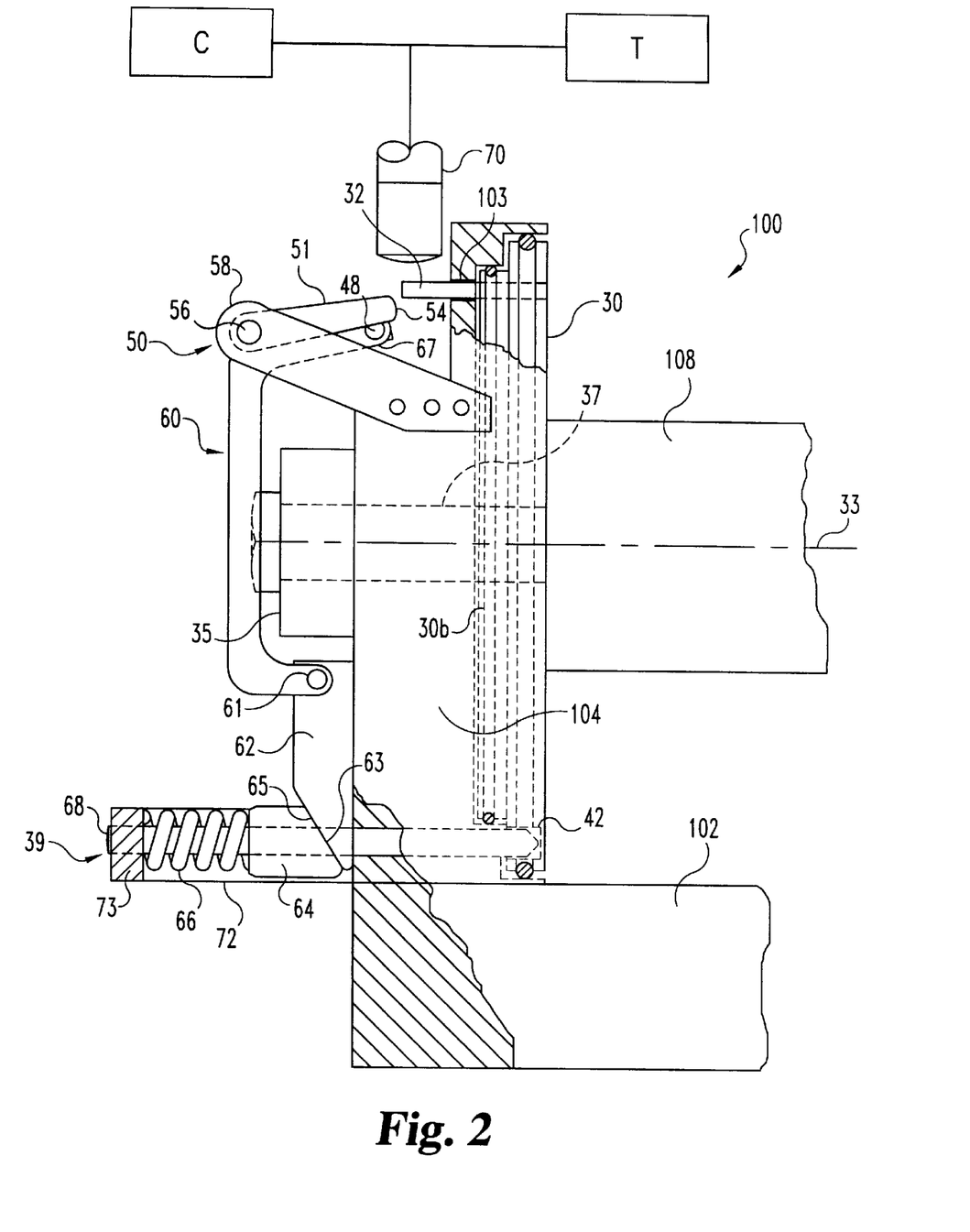
FIG. 2 is an enlarged side elevational view of a portion of the FIG. 1 device in a locked condition and including features of a programmable machine tool in diagrammatic form.
Figure 3:
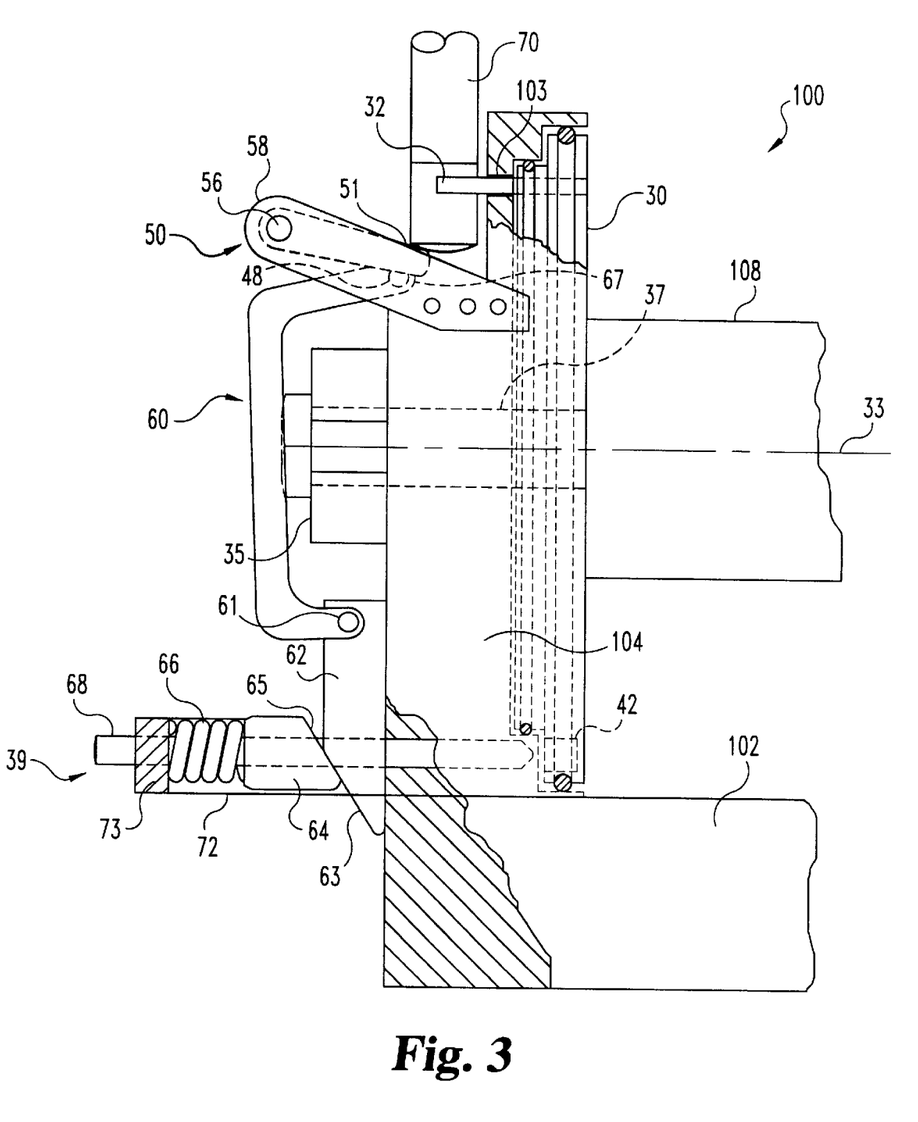
FIG. 3 is the view of the device shown in FIG. 2 with the device in an unlocked condition.

As shown in FIG. 2, spring 66 further biases trigger 51 through actuator 60 to a normally upward or raised condition. Cam 62 is also elevated such that cam follower 64 and plunger 68 are fully extended toward wheel 30 by spring 66. In this position, plunger 68 extends through support 104 and engages or contacts wheel 30 to prevent wheel 30 from rotating. When trigger 51 is pivoted downwardly as shown in FIG. 3, actuator 60 drives cam 62 downward with cam surface 63 pushing against inclined surface 65 to move cam follower 64 away from wheel 30. Accordingly, plunger 68 is disengaged or removed from contact with wheel 30, thereby freeing wheel 30 for rotation about axis 33.

Machining of metal or other objects may involve the production or use of fluids, scraps, and other contaminates or including fine particles. Thus, indexing device 100 can further be provided with a cover 80 that protects trigger assembly 50 and stop assembly 39, as shown cutaway in FIG. 1. Optionally, cover 80 can be excluded altogether or adapted to cover only selected portions of the device 100 in addition to or in place of covering trigger 51 and/or stop assembly 39. Cover 80 is mounted to support 104 and is normally spring biased to a closed position, and is illustrated in FIG. 1 as partially open. Cover 80 is movable by control member 70 to allow access to trigger 51 and index pins 32. Preferably, cover 80 includes a trip 82 that facilitates movement of cover 80. Trip 82 has angled portion 84 positioned generally above contact surface 52 of trigger 51. Angled portion 84 is preferably angled at least 10 degrees from vertical and preferably angled from at least 25 to 45 degrees from vertical. As control member 70 moves along downwardly along angled portion 84, cover 80 is moved away from contact surface 52 so that control member 70 can access contact surface 52. When control member 70 is moved upwardly, the release of downward pressure allows the cover member springs to move cover 80 back to its FIG. 1 position.

Figure 5:
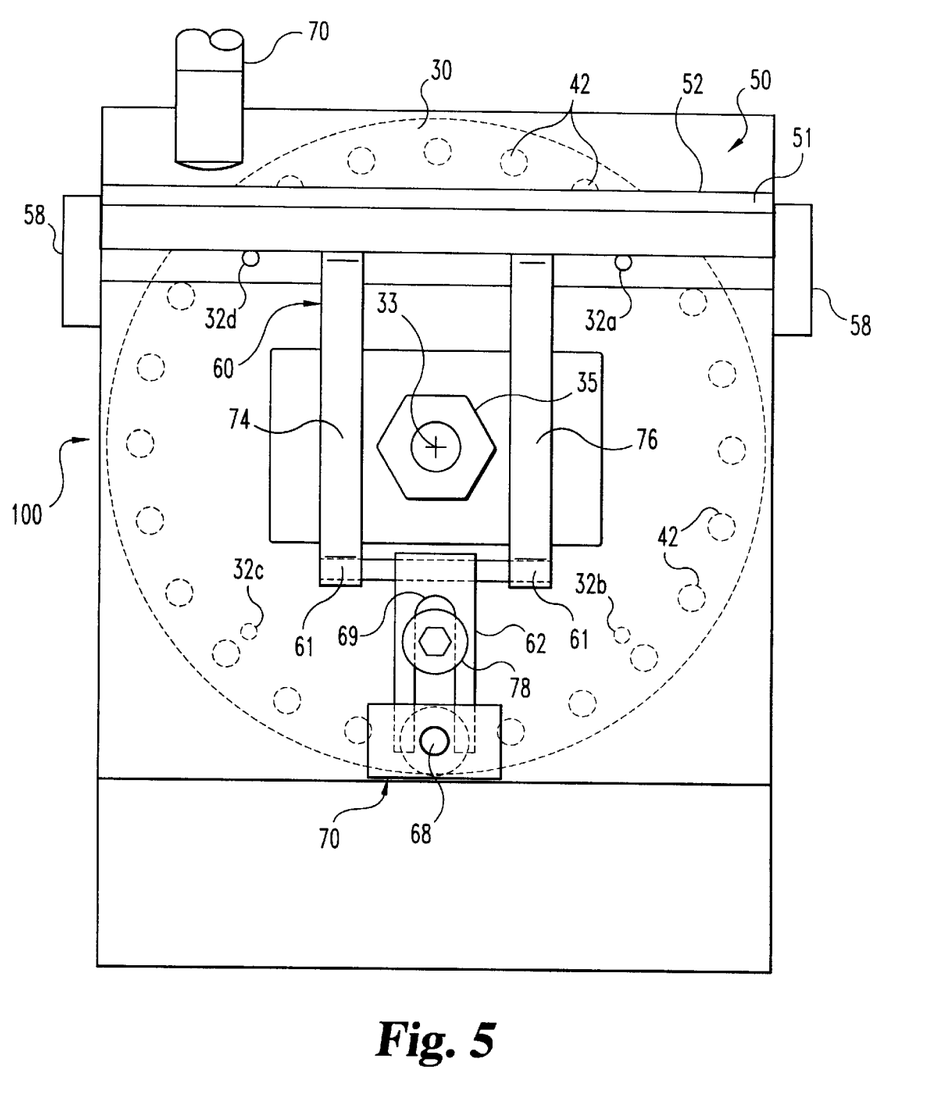
FIG. 5 is a rear elevational view of the portion of the device shown in FIG. 4.

As shown in FIG. 5, index wheel 30 has a plurality of plunger holes 42, or preferably tapered pockets, at angularly spaced positions about axis 33. Plunger 68 is positionable in plunger holes 42, as shown in FIG. 2, so that plunger 68 can prevent rotation of wheel 30 and fixture 108 during machining operations. Plunger 68 can also be tapered at its insertion end to ease insertion and/or to fit within the tapered holes 42. Preferably, plunger holes 42 extend at least partially but not entirely through wheel 30 to prevent particles and contaminates generated at the work surface from damaging the interior movable parts of device 100. In an alternate embodiment where plunger holes 42 do extend entirely through index wheel 30, a cap or seal can be provided over the holes 42 at wheel face 30a.

In the illustrated embodiment, plunger holes 42 are each equidistant from the axis of rotation 33 and are spaced every fifteen degrees about the axis 33. However, more or fewer holes 42 can be provided, and plunger holes 42 need not be spaced at regular intervals about axis 33. Particularly, in one embodiment of the invention, the holes can be custom drilled at specified locations about the axis of rotation. Therefore, with a specified pattern of holes 42, a particular wheel 30 for working device 100 can be fabricated for a particular application. Furthermore, by exchanging different index wheels 30 having different predrilled patterns of plunger holes 42, a single working device 100 can be provided that is readily adaptable for various custom applications.

Index wheel 30 also has a plurality of index pins 32, such as the four pins 32a, 32b, 32c, and 32d illustrated in FIG. 5, for rotating wheel 30. Pins 32 are spaced at predetermined angular positions about rotational axis 33, and are preferably equally positioned about the axis 33 as illustrated. Pins 32 are rigidly coupled to wheel 30 by threaded engagement, frictional engagement, welded attachment, or other known means and can include breakaway grooves for safety. Pins 32 preferably extend sufficiently from wheel 30 so that the sides of pins 32 can be contacted by control member 70 to rotate wheel 30. In the illustrated embodiment, control member 70 is vertically oriented with respect to axis 33, and has an operational stroke controlled so that it contacts pins 32 along a horizontal line that extends parallel to inner face 30a of wheel 30 and transversely to axis 33. Other orientations for control member 70 are also contemplated.

Indexing device 100 is arranged so that at least one index pin 32 is always within the operational stroke of control member 70. Control member 70 can rotate wheel 30 in either direction about axis 33 regardless of the particular angular position of wheel 30. Wheel 30 is rotatable in either direction by positioning control member 70 on the side of index pin 32 opposite the direction of rotation. In the preferred embodiment, though control member 70 has a single operational stroke that only partially rotates wheel 30 about axis 33, control member 70 can rotate wheel 30 three hundred and sixty degrees about axis 33 by using successive operational strokes to contact the next adjacent index pin 32. It is contemplated that the operational stroke of control member 33 can extend along all or a portion of the entire length of contact surface 52.

In the illustrated embodiment there are provided four index pins 32 spaced about wheel 33 at equal angular positions with respect to axis of rotation 33, though any arrangement of three or more pins where the angle between any two successive pins is less than 180 degrees is contemplated. For example, with wheel 30 in the position shown in FIG. 5, either pin 32a or pin 32d can be readily contacted by control member 70 to rotate wheel 30 in either direction about axis 33. If wheel 30 is rotated by control member 70 forty-five degrees from the FIG. 5 position in a clockwise direction about axis 33, pin 32d is moved to the 12 o'clock position. In this position, the now 12 o'clock pin 32d could be contacted on either side by control member 70, depending on the desired rotational direction. In this position, pin 32a would be at a 3 o'clock position, making pin 32a inaccessible to control member 70. Upon a further forty-five degree clockwise rotation of wheel 30, pins 32c and 32d would be each rotated to positions that are accessible by control member 70. Thus, it should be understood that at least one pin 32 is always accessible for either clockwise or counterclockwise rotation of wheel 30.

Other embodiments contemplate that device 100 could be constructed so that wheel 30 is provided with a single index pin 32 or two index pins 32, and control member 70 contacts these one or two pins 32 to rotate wheel 30 about axis 33 in either direction. While the illustrated embodiment contemplates that wheel 30 is fully rotational about axis 33, the range of rotation could also be limited to any amount less than three hundred and sixty degree movement about axis 33. Trigger assembly 50 is constructed and arranged to release wheel 30 when trigger 51 is actuated while allowing control member 70 to simultaneously contact trigger 51 and one of the index pins 32. Trigger 51 is pivotally mounted to support arms 58 and in the illustrated embodiment is positioned slightly below the top portion of wheel 30. Trigger 51 may be positioned elsewhere, such as above the top portion of wheel 30, so long as control member 70 can contact trigger 51 and at least one of the pins 32. Trigger 51 has contact surface 52 that is contacted by control member 70 as control member 70 moves downwardly. This downward force applied by control member 70 rotates trigger 51 downwardly about pin 56, thereby moving actuator 60 downwardly against cam follower 64 to release plunger 68 from wheel 30. Contact surface 52 extends along the length of trigger 51, and control member 70 can actuate trigger 51 by contacting it anywhere along contact surface 52. Accordingly, contact surface 52 and index pins 32 are positioned in relation to one another such that control member 70 contact a respective one of the pins 32 when trigger 51 is depressed to disengage plunger 68 from wheel 30.

Figure 4:
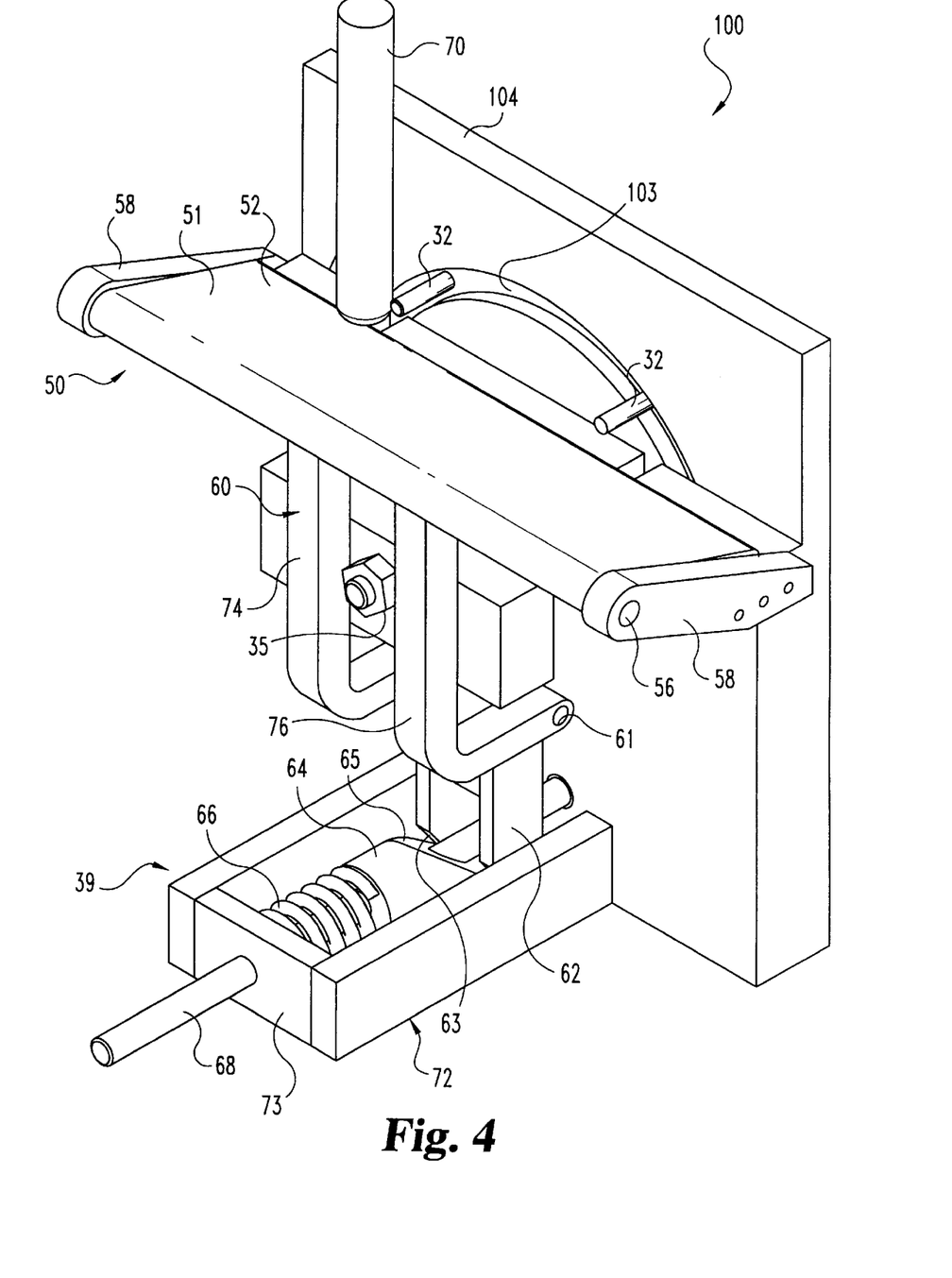
FIG. 4 is a perspective end view of the portion of the device of FIG. 2.

Further aspects of trigger assembly 50, actuator 60, and cam 62 are shown in FIGS. 4 and 5. Actuator 60 includes a pair of spaced rigid arms 74 and 76 extending between trigger 51 and cam 62. Rigid arms 74 and 76 are pivotally coupled to the underside of trigger 51 via pins 48. Arms 74 and 76 each extend downwardly from trigger 51 across axis 33 where each is secured to cam 62 via pins 61. Cam 62 has a slot 69 for receiving a screw 78 that is slideably engaged with support 104 to movably secure cam 62 thereto. Cam 62 is movable by trigger 51 through actuator 60 to remove plunger 68 from holes 42 in wheel 30.

The end of plunger 68 can be tapered to facilitate insertion in holes 42 and/or to assure that plunger 68 is aligned with the center of the respective hole 42 when inserted therein. In one embodiment, the end of plunger 68 is tapered at about forty-five degrees. Accordingly, if plunger 68 is inserted into a respective one of the holes 42 whose center is not precisely aligned with the plunger, the tapered end of plunger 68 imparts a restoring force that aligns plunger 68 and hole 42. Thus, plunger 68 facilitates alignment and maintenance of wheel 30 at the precise desired angular position. In one technique control member 70 rotates wheel 30 to position wheel 30 in gross alignment with a desired one of the holes 42 at a predetermined angular position of fixture 108. Control member 70 is then lifted from trigger 51 to raise cam 62. Spring 66 forces plunger 68 into the grossly aligned hole 42 to finally align wheel 30 and consequently fixture 108.

Trigger assembly 50 also provides an indication of whether plunger 68 is fully seated within hole 42. If plunger 68 does not fully seat in hole 42, spring 66 cannot bias arms 74 and 76 of actuator 60 and trigger 51 to the fully upward position as shown in FIG. 2. Consequently, a sensor can be provided on trigger assembly 50 or actuator 60 to indicate when both or either of these components are positioned such that plunger 68 is fully seated in hole 42. It is also contemplated that stop assembly 39 can be monitored by direct observation of plunger 68, such as at end wall 73, or by placing a sensor on plunger 68 to indicate if plunger 68 is fully seated in a hole 42. Accordingly, the device 100 can be adapted to communicate a signal indicating the locked status of wheel 30 with stop assembly 39. The machine tool to which device 100 is mounted is provided with control member 70 that is programmed by controller C to interface with device 100 to rotate fixture 108. Controller C is programmable to relay commands to control member 70 that cause control member 70 to actuate trigger 51 and slide along contact surface 52 of trigger 51 to contact one of the pins 32 and rotate wheel 30. Controller C is further programmable to rotate wheel 30 a desired amount, and then remove control member 70 from contact with contact surface 52 and pin 32, thereby releasing trigger 51. Spring 66 raises actuator 60 and trigger 51 and positions plunger into a corresponding one of the holes 42 of wheel 30 to lock wheel 30 in the desired position.

In the illustrated embodiment, controller C is programmable to position control member 70 on either side of a respective one of the index pins 32 at any angular position of wheel 30 to actuate trigger 51. Contact surface 52 is positioned with respect to control member 70 and index pins 32 so that simultaneous operative contact is maintained by control member 70 with both trigger 51 and a respective one of index pins 32 during the operational stroke of control member 70 at any angular position of the rotary member 30. Accordingly, in the illustrated embodiment, contact surface 52 has a length that extends at least the distance between adjacent index pins 32 so that control member 70 can maintain trigger 51 in a depressed condition throughout its operational stroke.

As programmed, various tools of machine tool T work on the parts mounted on fixture 108. Device 100 holds these parts at a particular angle and can rotate the part about axis 33 to work on the parts at a different angle. The machine tool operator can rotate device 100 in either direction about axis 33 as is required or desired to access the parts mounted on the fixture 108 with another tool. While not essential, for ease of programming the machine tool, the index pins 32 are preferably equally spaced about axis 33 of wheel 30, and most preferably pins 32 are each disposed at the same radial distance from axis 33. Consequently, the length of the operative stroke of control member 70 along contact surface 52 necessary to accomplish the desired rotation of fixture 108 can be calculated using geometric principles. For example, if index pins 32 are spaced a distance r from axis 33, and a particular index pin 32 is at an angular position of θ, the amount of horizontal displacement Δx of the particular pin 32 necessary to produce a desired angular displacement Δθ of fixture 108 can be calculated using the following formula: Δx=r(cos(θ+Δθ)−cos(θ)).

Figure 6:
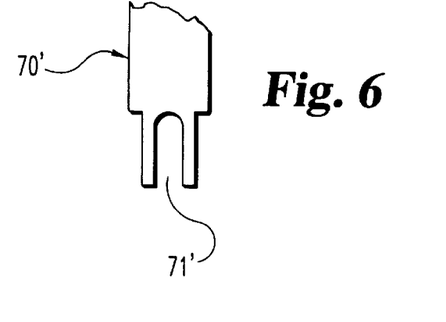
FIG. 6 is an elevational view of an alternate embodiment control member usable with the indexing device of FIG. 1.

FIG. 6 illustrates a further embodiment of a control member 70' that has an inverted U-shaped slot 71' for receiving a respective one of the index pins 32. An advantage to the configuration of control member 70' is that after rotating wheel 30 in a first direction control member 70' does not need to be repositioned to an opposites side of the respective index pin in order to rotate wheel 30 in the opposite direction.

It is understood that alternative designs and control parameters may be used as would occur to those of skill in the art. A conventional programmable machine tool may be programmed according to principles and techniques known in the art, such as described in U.S. Pat. Nos. 4,477,754 to Roch et al. and 5,453,933 to Wright et al., each of which is specifically hereby incorporated herein by reference in its entirety.

It is contemplated that control member 70 can be constructed to slide, pivot, roll, or otherwise translate along contact surface 52. In the illustrated embodiment contact surface 52 is a smooth flat surface and that control member 70 slides therealong to actuate trigger 51 and rotate wheel 30. As control member 70 translates along contact surface 52, pin 32 slides along the outer cylindrical surface of control member 70 since pin 32 travels in an arc about the axis of rotation 33 as wheel 30 rotates. With respect to control member 70', slot 71' should preferably have a depth sufficient to accommodate this length of travel of index pin 32 along the control member.

In the illustrated embodiment, wheel 30, pins 32, and trigger assembly 50 are configured for contact by a vertically oriented control member 70; however, other configurations are also contemplated. For example, device 100 may be configured so that control member 70 accesses these components from the sides or bottom of device 100. Further, while pins 32 are illustrated extending parallel to axis of rotation 33, pins 32 could extend in any direction and from any surface of the wheel 30 with appropriate modifications to device 100. Pins 32 can be provided with apertures to receive control member 70. Further, control member 70 need not begin nor retain any particular angular orientation during its operative stroke. Control member 70 can also include other shapes or configurations, including curved or sectioned configurations. For example the angular orientation of control member 70 can change during operational stroke contacting pin 32 and/or trigger 51. Further, control member 70 can be comprised of more than one member, or can include a single member that is adapted to have distinct trigger contacting and pin contacting portions.

Although stop assembly 39 includes in the illustrated embodiment plunger 68 that is received in holes 42, it is also contemplated that stop assembly 39 can have other forms. For example, plunger 68 can be replaced by a wheel locking mechanism that provides ratcheting or frictional engagement with wheel 30. Further, stop assembly 39 can be provided on base 102, support 104, or wheel 30, so long as it is adapted to stop rotation of wheel 30.

Figure 7:
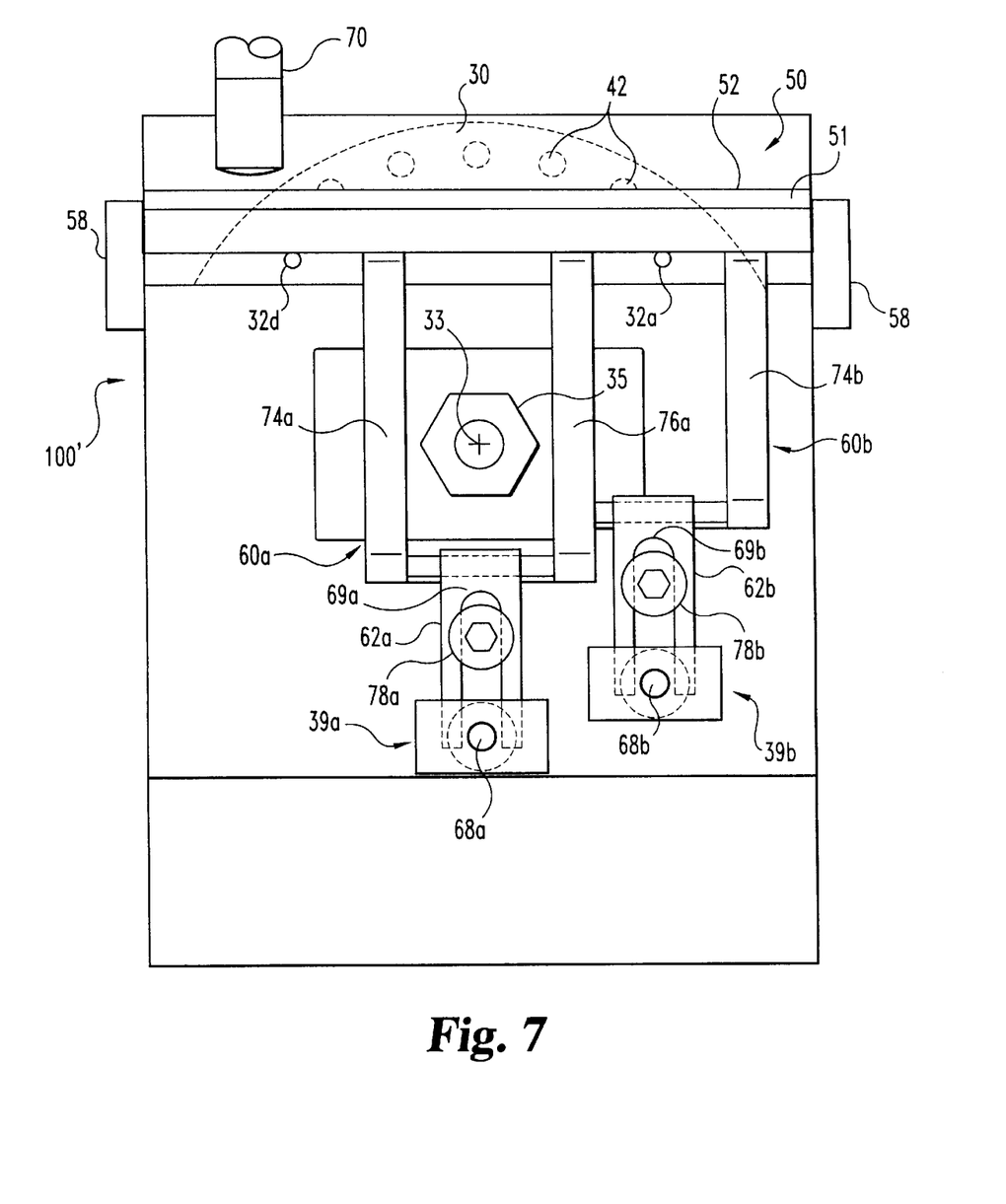
FIG. 7 is a rear elevational view of an indexing device similar to the device of FIG. 1 but including a second stop assembly.

Referring now to FIG. 7, another embodiment of an indexing device indicated at 100' that includes a first stop assembly 39a and a second stop assembly 39b. Device 100' is similar to device 100 except for the inclusion of second stop assembly 39b. Stop assembly 39a includes plunger 68a and stop assembly 39b includes plunger 69b that are each actuated by trigger assembly 50. Plungers 68a, 68b are each alignable with holes 42 and are positioned such that plunger 68a can be seated in a hole 42 while plunger 68b is positioned between adjacent ones of other holes 42. Conversely, plunger 68b can be seated in a hole 42 while plunger 68a is positioned between adjacent ones of other holes 42. Accordingly, the provision of second plunger 68b on device 100' provides up to twice as many angular positions for locking wheel 30 as provided for in device 100. Additional stop assemblies can be provided to increase the number of available angular positions for positioning fixture 108.

Figure 8:
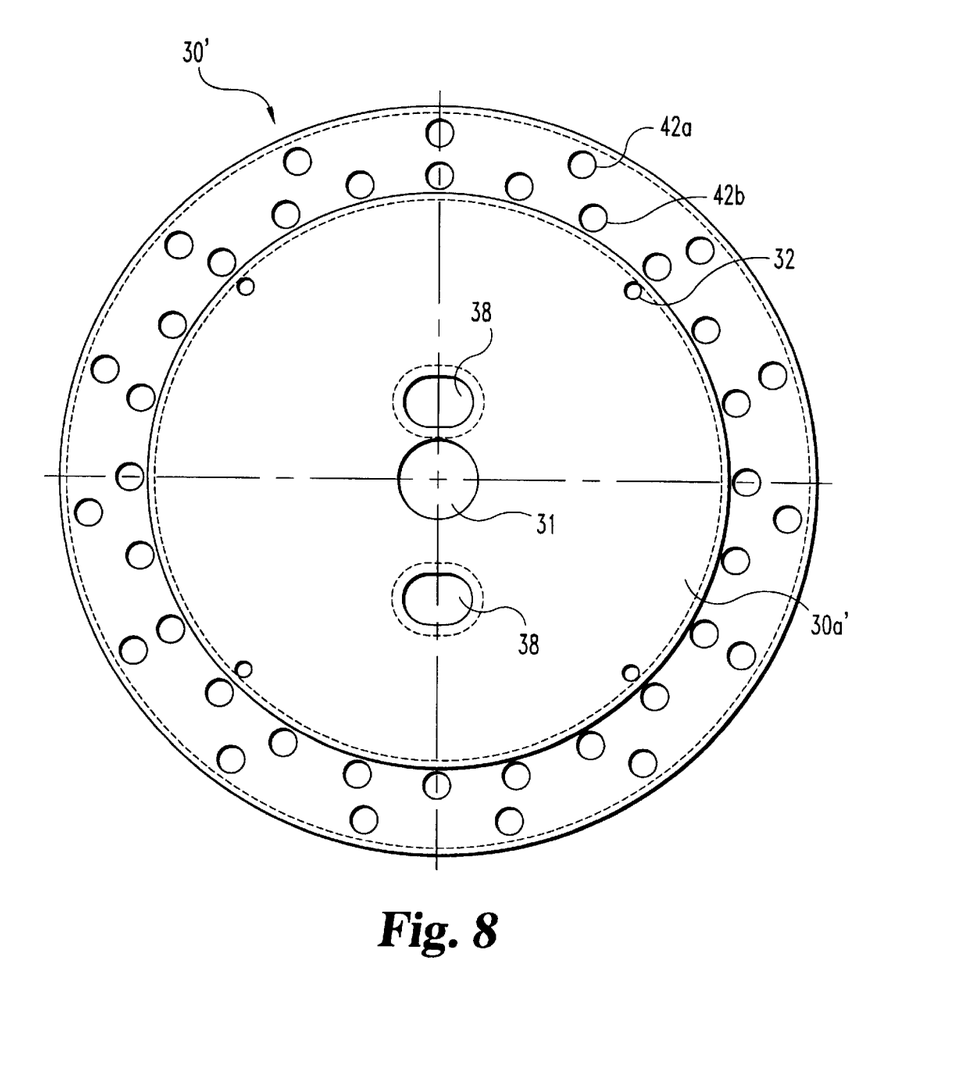
FIG. 8 is an end elevational view of an alternate embodiment indexing wheel usable with the indexing device of FIG. 1.

While the stop assembly 39b is actuated by trigger assembly 50, additional trigger assemblies 50 and control members 70 could be provided to actuate these additional stop assemblies. In addition, stop assembly 39b can be positioned to contact holes in wheel 30 that are positioned at a different radius from axis 33 than holes 42. For example, as shown in FIG. 8, an alternate wheel 30' is provided with first holes 42a and second holes 42b that are closer to axis 33 than first holes 42a. Holes 42a can be engaged by a plunger from a first stop assembly and holes 42b can be engaged by a plunger from a second stop assembly. Thus, wheel 30' provides a greater number of lockable angular positions than that provided by wheel 30. A further advantage is that wheel 30' provides these additional locking positions without sacrificing structural integrity of the wheel 30' by providing closely spaced holes 42a.

An additional feature of wheel 30' is illustrated in FIG. 8 as well. Wheel 30' has a center bore 31 for receiving an axle. Wheel 30' also includes elongated slotted holes 38 for mounting work holding fixture 108 to surface 30a'. Work holding fixture 108 may be securely held on wheel 30' at various angles with respect to axis 33 by adjusting its relative positioning in slotted holes 38. Consequently, slotted holes 38 provide the added advantage of fine adjustment of the relative position of work holding fixture 108 with respect to wheel 30'. Preferably, slotted holes 38 are sized such that fixture 108 can be adjusted up to approximately ten degrees about axis 33, with the capability to provide an adjustment of up to five degrees most preferred.

Preferably, work holding fixture 108 is initially mounted to wheel 30' during set up. Fixture 108 can then be fine tuned to a desired initial position in slots 38, and mounting screws in slots 38 are tightened to secure fixture 108 to the wheel. After a period of use, the alignment of fixture 108 on wheel 30' can be checked and adjusted as necessary. Preferably, the mounting screws are accessible, and fixture 108 can be easily removed and replaced with a different fixture as needed.

The indexing devices of the present invention are preferably constructed out of a lightweight and rigid material to minimize the amount of weight placed on the work surface of the machine tool. Accordingly, most components of the indexing device can be made primarily out of aluminum where particular parts, such as the index wheel 30 and the index pins 32, can be constructed from hardened and ground steel. It is contemplated in a particular embodiment of the present invention that the indexing device has a weight less than 80 pounds. It is further contemplated in a particular embodiment that the weight of the indexing device is less than about 25 pounds.

The present invention contemplates modifications as would occur to those skilled in the art. It is also contemplated that compositions and processes embodied in the present invention can be altered, rearranged, substituted, deleted, duplicated, combined, or added to other processes as would occur to those skilled in the art without departing from the spirit of the present invention. In addition, the various stages, steps, procedures, techniques, phases, and operations within these processes may be altered, rearranged, substituted, deleted, duplicated, or combined as would occur to those skilled in the art. All publications, patents, and patent applications cited in this specification are herein incorporated by reference as if each individual publication, patent, or patent application was specifically and individually indicated to be incorporated by reference and set forth in its entirety herein.

Further, any theory of operation, proof, or finding stated herein is meant to further enhance understanding of the present invention and is not intended to make the scope of the present invention dependent upon such theory, proof, or finding. While the invention has been illustrated and described in detail in the drawings, examples and foregoing description, the same is considered to be illustrative and not restrictive in character, it is understood that only the preferred embodiments have been shown and described and that all changes and modifications that come within the spirit of the invention are desired to be protected.

What is claimed is:

1. An indexing device for use with a machine tool including a control member, the indexing device comprising:
   a support member;
   a rotary member coupled to said support member and having an axis of rotation, said rotary member being further adapted for coupling to a work holding fixture;
   three or more pins extending from a surface of said rotary member, said pins positioned about said axis of rotation of said rotary member such that the angle between any two adjacent pins relative to the axis of rotation is less than 180 degrees;
   a stop assembly moveable between a first position in contact with said rotary member and a second position allowing rotational movement of said rotary member; and
   a trigger assembly coupled to said stop assembly, wherein the control member is positionable to contact said trigger assembly to move said stop assembly from said first position to said second position while the control member is contacting one of said pins to rotate said rotary member.

2. The indexing device of claim 1, wherein said rotary member is rotatable in either direction about said axis of rotation.

3. The indexing device of claim 1, wherein:
   said pins extend from said rotary member generally parallel to the axis of rotation of said rotary member at generally equally spaced angular positions relative to the axis of rotation of said rotary member; and
   the control member has a substantially linear operative stroke along said trigger assembly while in contact with one of said pins to rotate said rotary member.

4. The indexing device of claim 1, wherein said three or more pins comprises four pins.

5. The indexing device of claim 1, wherein:
   said rotary member has a plurality of holes formed therein; and
   said stop assembly includes a spring biased plunger positionable in one of said holes when said stop assembly is at said first position.

6. The indexing device of claim 5, further comprising a second stop assembly coupled to said trigger assembly, said second stop assembly including a spring biased plunger positionable in one of said holes of said rotary member when said plunger of said first stop assembly is positioned between adjacent ones of said holes.

7. The indexing device of claim 1, wherein said trigger assembly includes a trigger pivotally coupled to said support member.

8. The indexing device of claim 7, wherein said pins extend from said rotary member towards said trigger in a direction parallel to the axis of rotation of said rotary member.

9. The indexing device of claim 1, wherein said control member is positionable to depress said trigger assembly to move said stop assembly to said second position while said control member is in contact with one of said pins.

10. A device for machining a work piece, comprising:
a control member operatively connected to a machine tool;
at least one support member;
a rotary member rotatably mounted to said at least one support member, said rotary member including a work holding fixture coupled thereto;
a plurality of pins extending from said rotary member, each pin being angularly spaced about an axis of rotation of said rotary member with respect to the remaining ones of said plurality of pins;
a stop assembly moveable between a first position wherein said stop assembly engages said rotary member to a second position wherein said stop assembly is disengaged from said rotary member; and
a trigger pivotally coupled to said at least one support member, wherein said control member is positionable to actuate said trigger to move said stop assembly to said second position while contacting one of the plurality of pins to rotate said rotary member.

11. The device of claim 10, wherein said trigger has a length measured in a direction generally parallel to said trigger pivot axis, said length being greater than the distance between adjacent ones of said plurality of pins.

12. The device of claim 10, wherein:
said rotary member has a plurality of holes formed therein; and
said stop assembly includes a plunger, wherein said plunger is positionable in one of said plurality of holes when said stop assembly is in said first position.

13. The device of claim 12, further comprising a second stop assembly having a second plunger positionable in one of said plurality of holes when said second stop assembly is in said first position.

14. The device of claim 13, wherein said plurality of holes includes a first set of holes formed in said rotary member at a first radius from said axis of rotation of said rotary member.

15. The device of claim 14, wherein said plurality of holes includes a second set of holes formed in said rotary member at a second radius from said axis of rotation, whereby said second radius is different than said first radius.

16. The device of claim 10, further comprising a movable cover over said trigger.

17. The device of claim 11, wherein said cover includes an angled surface between said control member and said trigger, wherein said angled surface is inclined at an angle of at least about fifteen degrees with respect to said control member.

18. The device of claim 10, wherein:
said pins extend from said rotary member generally parallel to the axis of rotation of said rotary member at generally equally spaced angular positions relative to the axis of rotation of said rotary member; and
said control member has a substantially linear operative stroke along said trigger parallel to a face of said rotary member and transverse to said axis of rotation.

19. The device of claim 10, wherein said rotary member is rotatable in either direction about said axis of rotation of said rotary member.

20. A method of machining a work piece, comprising:
providing an indexing device including a rotary member rotatable about an axis and having a plurality of index pins extending therefrom, the indexing device further including a trigger coupled to a stop assembly, the stop assembly having a portion contactable with the rotary member when the stop assembly is in a first position to prevent rotation of the rotary member;
engaging a work holding fixture to the rotary member;
mounting a work piece to the work holding fixture;
contacting the trigger with a control member to move the stop assembly from the first position to a second position allowing rotation of the rotary member; and
contacting one of the plurality of index pins with the control member while also maintaining contact of the control member with the trigger to rotate the rotary member.

21. The method of claim 20, wherein contacting the trigger includes contacting the trigger with the control member from a direction non-parallel to the axis.

22. The method of claim 20, wherein contacting the trigger includes contacting an engagement surface of the trigger to move the stop assembly to the second position.

23. The method of claim 20, wherein contacting the trigger includes translating the control member along a contact surface of the trigger while contacting the one index pin.

24. The method of claim 20, further comprising releasing the trigger to return the stop assembly to its first position.

25. The method of claim 20, wherein the rotary member has a plurality of holes formed therein and the stop assembly includes a plunger positionable in at least one of the holes.

26. The method of claim 20, wherein the trigger includes an end surface positioned adjacent and parallel to a face of the rotary member.

27. The method of claim 20, wherein the pins extend from the rotary wheel in direction generally parallel to the axis of rotation.

28. An indexing device for use with a machine tool including a control member, the indexing device comprising:
a support member;
a rotary member having a plurality of index pins extending therefrom, said rotary member coupled to said support member and having an axis of rotation, said rotary member being further coupled to a work holding fixture; and
a trigger pivotally mounted to said support member, said trigger being coupled to a stop assembly movable between a first position in contact with said rotary member and a second position allowing rotational movement of said rotary member, said trigger having a contact surface with a length that is at least as great as the length between adjacent ones of said plurality of index pins, wherein the control member is positionable to simultaneously contact said trigger to move said stop assembly from said first position to said second position and one of said plurality of index pins and rotate said rotary member by translating said control member along said trigger contact surface.

29. The device of claim 28, wherein said trigger has an end surface positioned adjacent to said rotary member and extending parallel to a face of said rotary member.

30. The device of claim 28, wherein said stop assembly enables rotation of said rotary member when said trigger is pivoted by the control member.

* * * * *

UNITED STATES PATENT AND TRADEMARK OFFICE
CERTIFICATE OF CORRECTION

PATENT NO. : 6,328,508 B1  
DATED : December 11, 2001  
INVENTOR(S) : Arnold R. Jines Page 1 of 1

It is certified that error appears in the above-identified patent and that said Letters Patent is hereby corrected as shown below:

<u>Column 11</u>,  
Line 48, "11" should be -- 16 --.

Signed and Sealed this

Fourteenth Day of May, 2002

Attest:

Attesting Officer

JAMES E. ROGAN  
Director of the United States Patent and Trademark Office